(12) United States Patent
Svensson

(10) Patent No.: US 10,426,151 B2
(45) Date of Patent: Oct. 1, 2019

(54) DRAG ADJUSTMENT ASSEMBLY FOR A STAR DRAG REEL

(71) Applicant: Pure Fishing, Inc., Spirit Lake, IA (US)

(72) Inventor: Patrik Svensson, Asarum (SE)

(73) Assignee: Pure Fishing, Inc., Spirit Lake, IA (US)

( * ) Notice: Subject to any disclaimer, the term of this patent is extended or adjusted under 35 U.S.C. 154(b) by 182 days.

(21) Appl. No.: 15/490,164

(22) Filed: Apr. 18, 2017

(65) Prior Publication Data

US 2018/0295824 A1 Oct. 18, 2018

(51) Int. Cl.
*A01K 89/01* (2006.01)
*A01K 89/00* (2006.01)
*A01K 89/033* (2006.01)

(52) U.S. Cl.
CPC .......... *A01K 89/00* (2013.01); *A01K 89/046* (2015.05)

(58) Field of Classification Search
CPC .. A01K 89/033; A01K 89/057; A01K 89/058; A01K 89/059; A01K 89/028
See application file for complete search history.

(56) References Cited

U.S. PATENT DOCUMENTS

| | | | | |
|---|---|---|---|---|
| 5,615,840 A | * | 4/1997 | Bushnell | A01K 89/033 242/301 |
| 5,988,547 A | * | 11/1999 | Koelewyn | A01K 89/02 242/246 |
| 6,045,073 A | * | 4/2000 | Ikuta | A01K 89/059 242/260 |
| 6,152,390 A | * | 11/2000 | Datcuk, Jr. | A01K 89/059 242/270 |
| 6,286,772 B1 | * | 9/2001 | Koelewyn | A01K 89/016 242/246 |
| 6,578,785 B1 | * | 6/2003 | Hong | A01K 89/033 242/245 |
| 2003/0150945 A1 | | 8/2003 | Hong | |
| 2004/0113005 A1 | * | 6/2004 | Kitajima | A01K 89/033 242/243 |
| 2004/0200915 A1 | | 10/2004 | Nishikawa | |
| 2005/0279872 A1 | * | 12/2005 | Kitajima | A01K 89/033 242/245 |
| 2007/0007377 A1 | * | 1/2007 | Miyazaki | A01K 89/033 242/245 |
| 2007/0114314 A1 | * | 5/2007 | Bin Ahmad | A01K 89/059 242/245 |
| 2008/0093492 A1 | | 4/2008 | Tao | |
| 2011/0108651 A1 | | 5/2011 | Hyun | |
| 2013/0200194 A1 | | 8/2013 | Lawson et al. | |
| 2015/0129701 A1 | * | 5/2015 | Takechi | A01K 89/033 242/268 |

\* cited by examiner

*Primary Examiner* — Emmanuel M Marcelo
(74) *Attorney, Agent, or Firm* — Husch Blackwell LLP

(57) ABSTRACT

A drag adjustment assembly includes a lever arm unit, a nut, a first keyed structure, a second keyed structure and a spring. The lever arm unit forms a housing and includes at least one keyway. The nut, first keyed structure and second keyed structure are positioned in the housing. The first keyed structure and second keyed structure each include at least one key which engages the at least one keyway. The inner surface of the nut is threaded, and an outer surface of the first keyed structure has a corresponding thread. The spring is positioned between the first and second keyed structures.

20 Claims, 4 Drawing Sheets

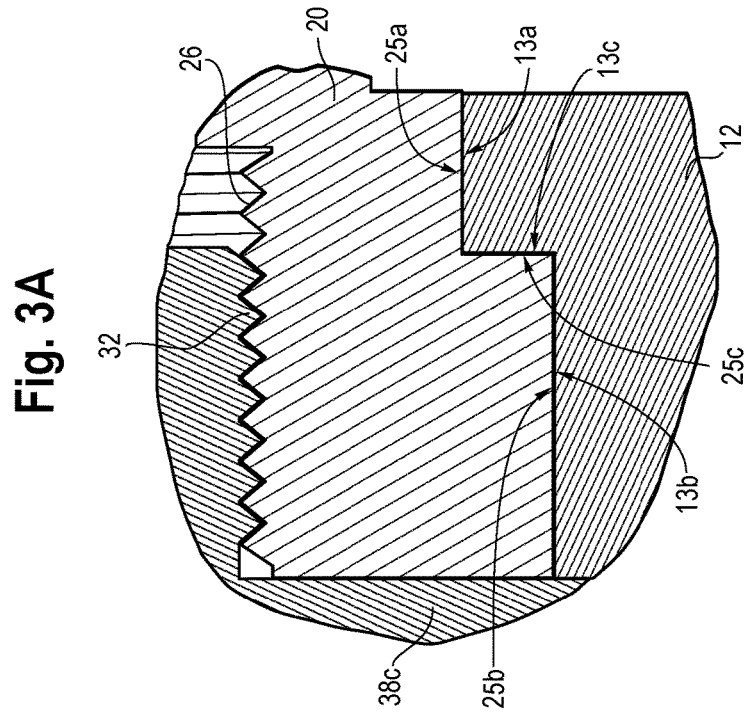
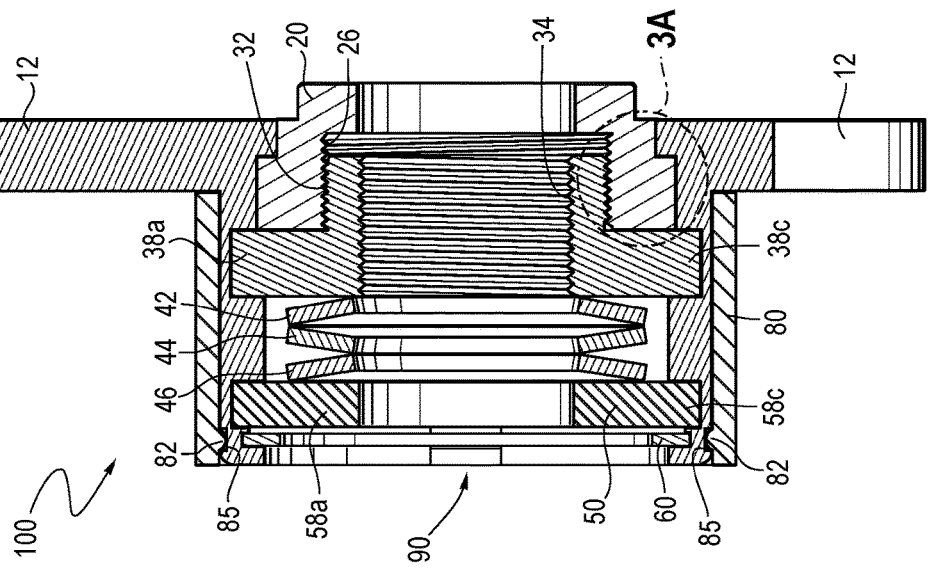

DRAG ADJUSTMENT ASSEMBLY FOR A STAR DRAG REEL

FIELD OF THE INVENTION

The present invention relates, generally, to the field of fishing reels. More particularly, the present invention relates to drag adjustment mechanism for fishing reels and, even more particularly, to a drag adjustment assembly for star drag fishing reels.

BACKGROUND OF THE INVENTION

Star drag mechanisms for fishing reels are known. Star drag mechanisms allow users to adjust the amount of drag on a fishing line within the range and at units permitted by the structure of the star drag mechanism. If either a greater range of adjustability or finer adjustability within the provided range is desired, users must take apart the star drag mechanism and replace components.

Moreover, different amounts and ranges of drag adjustment are preferred for different fishing environments. In some situations, a large range of adjustability is preferred, while in other situations only a small range of adjustability will be used. To address the need for changing ranges of drag adjustment, some anglers own multiple fishing reels and can select a desired reel (with the desired amount of drag adjustment) based on the fishing environment.

It would be advantageous if a new or improved drag adjustment assembly for adjusting drag of a star drag reel could be developed which addressed one or more of these problems.

SUMMARY OF THE INVENTION

In accordance with embodiments of the present disclosure, disclosed herein is a drag adjustment assembly. In an embodiment, the drag adjustment assembly comprises a lever arm unit forming a housing and comprising at least one keyway; a nut having a threaded inner surface positioned partially in the housing; a first keyed structure positioned in the housing, wherein the first keyed structure comprises at least one key engaging the at least one keyway and a threaded surface engaging threaded inner surface of the nut; a second keyed structure positioned in the housing, wherein the second keyed structure comprises at least one key engaging the at least one keyway; and a spring secured between the first and second keyed structures.

In an embodiment, the drag adjustment assembly comprises (A) a lever arm unit comprising (i) a circular base having a front surface, a rear surface, and an opening therethrough, (ii) a plurality of grasping portions extending radially from the circular base, and (iii) a cylindrical flange extending from the rear surface of the circular base coaxial with the opening and including a plurality of channels; (B) a nut comprising (i) a cylindrical body having an outer surface, a front surface, a rear surface, and an opening therethrough, wherein the opening has a threaded inner surface, and (ii) a driver head extending from the front surface, (C) a first keyed washer comprising (i) a cylindrical body having a front surface, a rear surface, and an opening therethrough, (ii) a plurality of tabs extending radially from the cylindrical body, and (iii) a cylindrical flange extending from the front surface coaxial with the opening, wherein the cylindrical flange has a threaded outer surface, (D) a second keyed washer comprising (i) a cylindrical body having an opening therethrough, and (ii) a plurality of tabs extending radially from the cylindrical body, (E) a spring comprising at least two Belleville washers each having an opening therethrough; and (F) a sleeve; wherein the nut is positioned in the cylindrical flange of the lever arm unit such that the opening of the nut is coaxial with the opening of the lever arm unit and the driver head projects beyond the front surface of the circular base of the lever arm unit; wherein the first keyed washer is positioned in the cylindrical flange of the lever arm unit such that each of the plurality of tabs engages one of the plurality of channels of the lever arm unit, the threaded outer surface of the cylindrical flange of the first keyed washer engages the threaded inner surface of the cylindrical flange of the nut, and the opening of the first keyed washer is coaxial with the openings of the nut and the lever arm unit; wherein the second keyed washer is positioned in the cylindrical flange of the lever arm unit such that each of the plurality of tabs engages one of the plurality of channels of the lever arm unit and the opening of the second keyed washer is coaxial with the openings of the first keyed washer, nut and the lever arm unit; wherein the at least two Belleville washers are positioned in the cylindrical flange of the lever arm unit between the first and second keyed washers in an alternating orientation such that the openings of the at least two Belleville washers are coaxial with the openings of the second keyed washer, the first keyed washer, the nut and the lever arm unit; and wherein the sleeve encircles the cylindrical flange of the lever arm unit.

In accordance with embodiments of the present disclosure, disclosed herein is a star drag reel. In an embodiment, the star drag reel comprises a lever arm unit forming a housing and comprising at least one keyway; a nut having a threaded inner surface positioned partially in the housing; a first keyed structure positioned in the housing, wherein the first keyed structure comprises at least one key engaging the at least one keyway and a threaded surface engaging threaded inner surface of the nut; a second keyed structure positioned in the housing, wherein the second keyed structure comprises at least one key engaging the at least one keyway; and a spring secured between the first and second keyed structures.

BRIEF DESCRIPTION OF THE DRAWINGS

FIG. 3 is a cross-sectional view thereof taken along line 3-3;

FIG. 3A is an enlargement of a portion of FIG. 3; and

DETAILED DESCRIPTION

Figure 1:
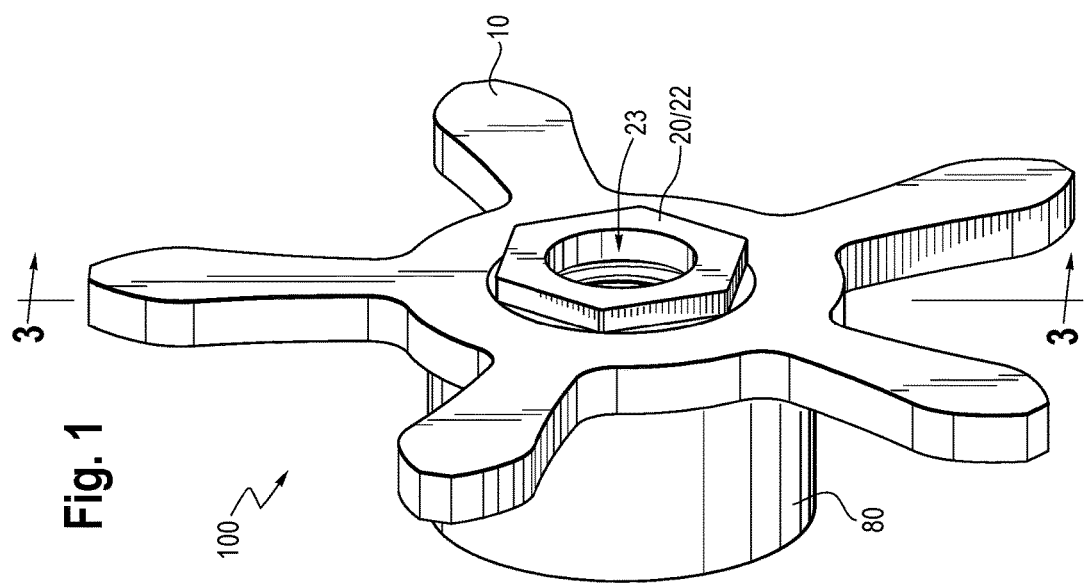
FIG. 1 is a perspective view of an assembled star drag reel including a drag adjustment assembly in accordance with embodiments of the present disclosure.

FIG. 1 shows a drag adjustment assembly 100 for a star drag reel in accordance with embodiments of the present disclosure. In the embodiment shown, much of the drag adjustment assembly 100 is housed within the sleeve 80 such that only the lever arm unit 10 and nut 20 are exposed. Particularly, only the driver head 22 of the nut 20 extends from the lever arm unit 10.

Figure 2:
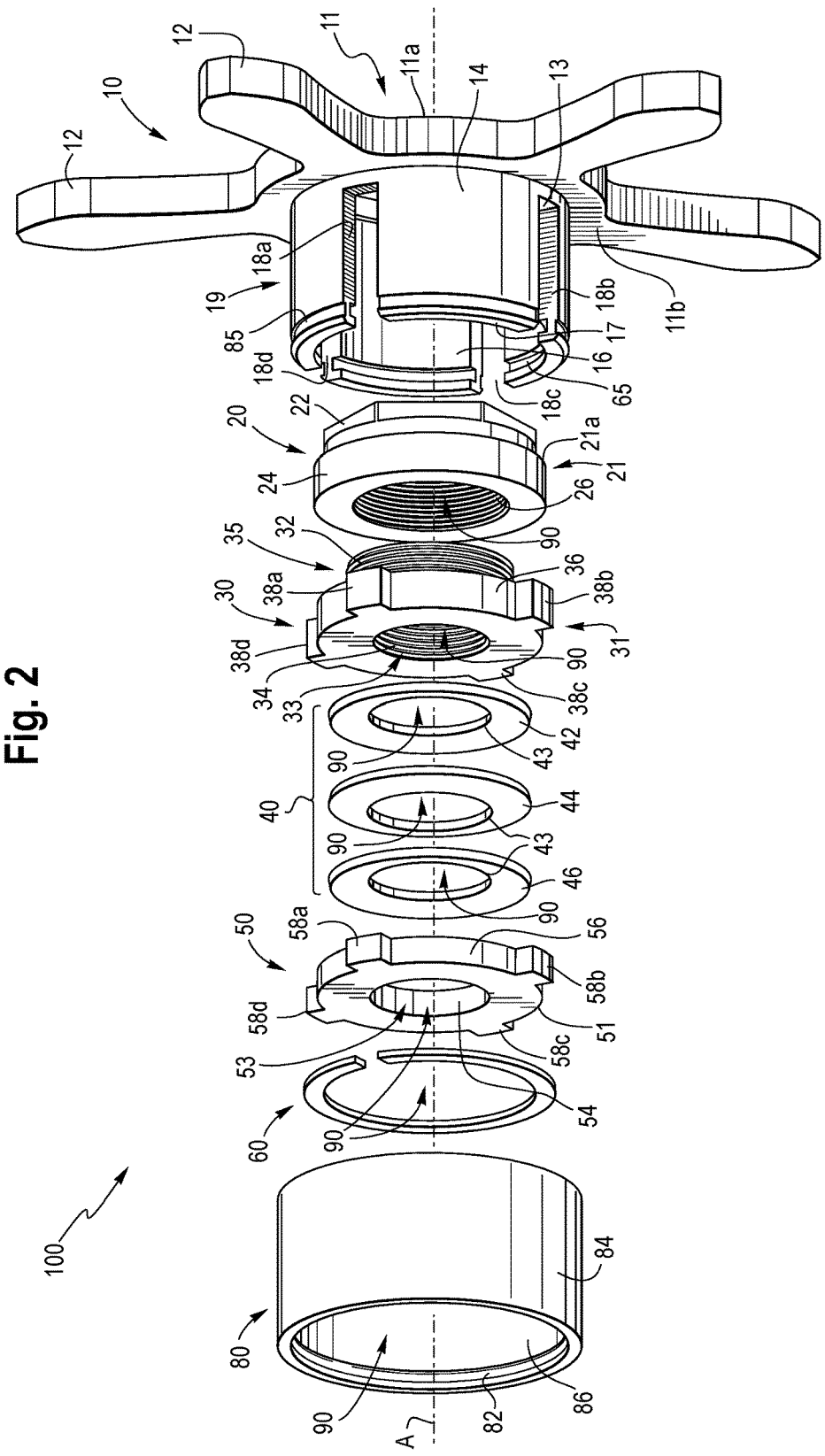
FIG. 2 is an exploded view thereof.

FIG. 2 is an exploded view of the drag adjustment assembly 100 in greater detail. The lever arm unit 10 and the nut 20 are again shown. The drag adjustment assembly 100 also includes first keyed washer 30, spring 40 (composed of Belleville washers 42, 44, 46 in the embodiment shown), second keyed washer 50, locking ring 60 and sleeve 80.

The lever arm unit 10 includes a base 11 having a front surface 11a and a rear surface 11b. The base 11 is generally circular with an opening 13 extending through the center of the body 11 from the front surface 11a to the rear surface 11b such that the opening has a length equal to the thickness of the body 11. In the embodiment shown, the opening 13 is generally centrally positioned with respect to the body 11.

As shown perhaps best in FIG. 3, the inner diameter may not be consistent along the length of the opening 13. Rather, the opening 13 may have a stepped inner diameter. In the exemplary embodiment shown, the opening 13 has a first section 13a of a first inner diameter and a second section 13b of a second inner diameter, wherein the first inner diameter is smaller than the second inner diameter.

The body 11 further includes at least two grasping portions 12 extending radially from the body 11 of the lever arm unit 10 and disposed around the opening 13. The grasping portions 12 are lever arms and are configured to assist a user in rotating the lever arm unit 10 about the axis A. While the lever arm unit 10 is shown as having five grasping portions 12, giving the lever arm unit 10 a star-like appearance, it will be appreciated that any number of grasping portions may be provided. The specific shape and configuration of the grasping portions may vary by convenience.

Extending from the rear surface 11b of the body 11 so as to be coaxial with the opening 13 is a generally cylindrical flange 19 which forms a housing for portions of the drag adjustment assembly 100. The outer and inner surfaces 14, 16, respectively, of the flange 19 are generally smooth, resulting in generally consistent inner and outer diameters along the length of the flange 19, with the exception being a pair of grooves 65, 85 in the outer wall 14 and inner wall 16, respectively. The flange 19 also includes a plurality of channels 18 extending a majority of the length of the flange 19 in a direction generally parallel with the axis A. While in the embodiment shown there are four channels 18a, 18b, 18c, 18d evenly positioned around the body 11, as discussed in more detail below, any number of channels 18 can vary depending on the specific shape and configuration of the keyed washers 30, 50. Similarly, while each of the four channels 18a, 18b, 18c, 18d is shown as generally rectangular, the specific shape and geometry of each channel can vary depending on the shape and configuration of the tabs 38, 58 of the keyed washers 30, 50, as will be discussed in further detail below.

In the embodiment shown, each of the channels 18a, 18b, 18c, 18d extends from the free end 17 of the flange 19 and ends before contacting the rear surface 11b of the body 11.

Turning to the nut 20, the nut 20 has a main body 21 which is generally cylindrical with a driver head 22 on a first (front) side 21a of the body 21 and a generally flat second (rear) side 21b. In the embodiment shown, the nut 20 has a circular opening 23 approximately centrally located on the main body 21. In the embodiment shown, the driver head 22 is depicted as being a standard-sized hex head. However, in further embodiments, the specific shape and configuration of the driver head 22 can vary by convenience, such as, for example, based on common tools present to a certain geographical location or industry. For example, in other embodiments, the driver head 22 may have any known head shape/style, including flat, oval, pan, truss, round, hex, hex, button or socket cap. Moreover, for any of the head shapes/styles, the particular drive style may likewise vary. Exemplary drive styles include Phillips, Frearson, slotted, socket, hex, allen, square and star style.

The outer surface 24 of the body 21 is stepped, such that the outer diameter of the nut 20 is not consisting along the length of the nut body 21. In the exemplary embodiment shown, and as shown perhaps best in FIG. 3A, the first stepped portion 25a has a first outer diameter and the second stepped portion 25b has a second outer diameter such that the first outer diameter is smaller than the second outer diameter.

As shown with particular reference to FIG. 3, both the first outer diameter and second outer diameter of nut body 21 are less than the inner diameter of the cylindrical flange 19, thereby allowing the nut 20 to be inserted into the cylindrical flange 19 such that the opening 23 of the head 22 is coaxial with the opening 13 of the lever arm unit 10. The outer diameter of the first stepped portion 25a of the nut body 21 is just slightly smaller than that inner diameter of the first section 13a of the opening 13 and the outer diameter of the second stepped portion 25b of the nut body 12 is just slightly smaller than the inner diameter of the second section 13b of the opening 13. In this way, the nut 20 is able to slide into the opening 13 of the lever arm unit body 11 such that the driver head 22 extends out of the opening 13 and past the front surface 11a of the body 11. The inner surfaces of the first and second stepped sections 11a, 11b of the body 11 contact the corresponding outer surfaces of the first and second portions 25a, 25b of the nut body 21, respectively, such that the interface between surface 11c of the body 11 and surface 25 of the nut body 21 prevents the nut 20 from extending further out of the opening 13, as shown in FIG. 3A.

The inner surface 26 of the nut body 21 is threaded.

The first keyed washer 30 is a generally cylindrical structure having a body 31 with a smooth outer surface 36. Extending radially from the outer surface 36 are a plurality of tabs 38. In the specific embodiment shown, there are four tabs 38a, 38b, 38c, 38d evenly spaced around the body 31 and each having a generally rectangular shape. These four tabs 38a, 38b, 38c, 38d correspond to the channels 18a, 18b, 18c, 18d of the lever arm unit 10. The number, positioning and shape of tabs 38 may vary, provided that the channels 18 of the lever arm unit 10 are changed in a corresponding manner.

The outer diameter of the body 31 (not including the tabs 38) is just less than the inner diameter of the cylindrical flange 19 of the lever arm unit 10. The outer diameter of the body 31 plus the tabs 38 is greater than the inner diameter of the cylindrical flange 19, but no greater than equal to the outer diameter of the cylindrical flange 19 of the lever arm unit 10.

Extending from the front surface 31a of the body 31, so as to be coaxial with the opening 33 of the first keyed washer 30, is a generally cylindrical flange 35. The outer surface 32 of the flange 35 is threaded. The inner surface 34 of the body 31 and flange 35 are threaded with the thread being continuous along those two portions. The inner diameter of the opening 33 is consistent along its length. The threading on the inner surface 34 of the body 31 and flange 35 corresponds with threading on the outer surface of a main drive shaft of a fishing reel (not shown). The main drive shaft of a fishing reel, if shown, would extend through the opening 23 of the nut 20 and the opening 33 of the first keyed washer 30 such that threads on the exterior of the main drive shaft would engage the threads on the inner surface 34 of the body 31 and flange 35.

The second keyed washer 50 has a shape and configuration similar to that of the first keyed washer 30. As shown in FIG. 2, the second keyed washer 50 is a generally cylindrical structure having a body 51 with a smooth outer surface 56 and a generally circular opening 53. The opening 53 has a smooth surface and a consistent internal diameter. Extending radially from the outer surface 56 are a plurality of tabs 58. In the specific embodiment shown, there are four tabs 58a, 58b, 58c, 58d evenly spaced around the body 51 and each having a generally rectangular shape. These four tabs 58a, 58b, 58c, 58d correspond to the four tabs 38a, 38b, 38c, 38d of the first keyed washer 30 and to the channels 18a, 18b, 18c, 18d of the lever arm unit 10. Like the first keyed structure 30, the number, positioning and shape of the tabs 58 may vary, provided the tabs 58 are able to engage a corresponding channel 18 on the lever arm unit 10. It will be appreciated that the tabs 58 do not need to engage the same channel(s) 18 as the tabs 38 on the first keyed structure 30, but do so in a preferred embodiment.

The outer diameter of the body 51 (not including the tabs 58) is just less than the inner diameter of the cylindrical flange 19 of the lever arm unit 10. The outer diameter of the body 51 plus the tabs 58 is greater than the inner diameter of the cylindrical flange 19 but no greater than equal to the outer diameter of the cylindrical flange 19 of the lever arm unit 10.

The spring 40 is secured between the first and second keyed washers 30, 50 such that adjusting the distance between the first and second keyed washers 30, 50 changes the amount of compression on the spring 40.

In the embodiment shown, the spring 40 is composed of at least one, preferably two or more, and preferably at least three Belleville washers 42, 44, 46. A Belleville washer is type of spring shaped like a washer. The spring-like characteristic of a Belleville washer comes from the frusto-conical shape. Belleville washers are also known as disc springs, coned-disc springs and Belleville springs. In other embodiments, other springs or spring-like mechanisms may be used; however, in a preferred embodiment, the spring 40 is preferably at least one Belleville washer, and preferably a series of two or more Belleville washers.

While one Belleville washer may be used, stacking two or more Belleville washers in series changes the spring constant. Stacking Belleville washers such that the frusto-conical shapes are in the same orientation creates a stiffer spring, while alternating the orientation of the Belleville washers lowers the spring constant (greater deflection). In essence, alternating the orientation of Belleville washers in a stack is comparable to putting conventional coil springs in series. In view of the above, it will be appreciated that by using a series of Belleville washers as a spring, a spring with a specific or desired spring constant can be designed.

While the amount and orientation of Belleville washers can vary by design, as described above, in a preferred embodiment, such as in the embodiment shown, the spring 40 is composed of three Belleville washers 42, 44, 46 in an alternating stack arrangement, e.g., washer 42 angles away from the first keyed washer 30, washer 44 angles toward the first keyed washer 30, and washer 46 angles away from the first keyed washer 30. Similarly, while Belleville washers, and springs generally, come in a variety of diameters, it will be understood that the outer diameter of the Belleville washers used in the drag adjustment assembly 100 is less than the inner diameter of the cylindrical flange 19 of the lever arm unit 10.

The spring 40 (and particularly the three Belleville washers 42, 44, 46 in the embodiment shown) includes a central opening 43. As shown in FIG. 3, the openings 23, 33, 43, 53 of the nut 20, first keyed washer 30, spring 40 and second keyed washer 50, respectively, are coaxial, and particularly coaxial about axis A, to form a channel 90 extending through the drag adjustment assembly 100. The channel 90 is designed to receive a main drive shaft of a fishing reel (not shown).

With reference to FIG. 3, in the embodiment shown, each of the tabs 38a, 38b, 38c, 38d of the first keyed washer 30 and 58a, 58b, 58c, 58d of the second keyed washer 50 engages a corresponding one of the channels 18a, 18b, 18c, 18d of the lever arm unit 10. The threading on the outer surface 32 of the flange 35 corresponds to and engages the threading on the inner surface 26 of the bolt 20. With the engagement of the tabs 38a, 38b, 38c, 38d and 58a, 58b, 58c, 58d with the channels 18a, 18b, 18c, 18d and the engagement of the threads of the outer surface 32 of the flange 35 with the threads of the inner surface 26 of the nut 20, it will be appreciated that rotation of the lever arm unit 10 about axis A results in rotational movement of the nut 20, first keyed washer 30 and second keyed washer 50 collectively, as a unit, about the axis A, and therefore along a main drive shaft of a fishing reel (not shown). In contrast, rotation of the nut 20 alone, e.g., by using a wrench or other tool specified or permitted by the configuration of the driver head 22, about the axis A results in linear movement of the first keyed washer 30 relative to the nut 20. Specifically, when the nut 20 is rotated, rotational movement of the first keyed washer 30 is prohibited by the engagement of the tabs 38a, 38b, 38c, 38d with the channels 18a, 18b, 18c, 18d. As a result, the first keyed washer 30 is moved linearly in a direction parallel with the axis A due to the interaction of the engaging threads 36, 26. The tabs 38a, 38b, 38c, 38d and tabs 58a, 58b, 58c, 58d therefore function as keys and the channels 18a, 18b, 18c, 18d as keyways to form a keyed joint between the keyed washers 30, 50 and the lever arm unit 10.

Locking ring 60 sits in groove 65 in the inner surface 17 of the cylindrical flange 19 of the lever arm unit 10. The locking ring 60 has an outer diameter greater than the diameter of the groove 65. As a result, a portion of the locking ring 60 is exposed beyond the inner surface 17 of the cylindrical flange 19. The locking ring 60 provides a stop for the second keyed washer 50 and prevents the second keyed washer 50 from disengaging the cylindrical flange 19 of the lever arm unit 10 through the free end 17 of the flange 19.

The sleeve 80 is generally cylindrical and has a smooth inner surface 86 and a smooth outer surface 84. The inner diameter of the sleeve 80 is just greater than the outer diameter of the cylindrical flange 19 of the lever arm unit 10. The sleeve 80 provides a closed housing around the other components of the drag adjustment assembly 100 by covering the channels 18a, 18b, 18c, 18d in the cylindrical flange 19. In an embodiment, as shown in FIGS. 2 and 3, the sleeve 80 includes a lip 82 extending around its inner surface 86. The lip 82 engages the groove 85 on the outer surface 14 of the cylindrical flange 19 of the lever arm unit 10 to secure the sleeve 80 in place.

To adjust the drag on a fishing line using the drag adjustment assembly 100, a user rotates the lever arm unit 10. For example, rotating the lever arm unit 10 in a first direction causes the nut 20 and first keyed washer 30 to move closer to the second keyed washer 50. This compresses the spring 40 and increases the amount of drag on a fishing line. As the rotation of the lever arm unit 10 continues, compression of the spring 40 continues to increase until the first keyed washer 30 has moved along the main drive shaft of the fishing reel (not shown) as far as permitted by the fishing reel and/or drag adjustment assembly 100. Similarly, rotating the lever arm unit 10 in a second direction causes the nut 20 and first keyed washer 30 to move away from the second keyed washer 50. This movement relaxes the springs 40 and decreases the amount of drag on a fishing line.

When the first keyed washer 30 is as far away from the second keyed washer 50 as permitted by the nut 20, the keyed washer 30 is permitted the greatest range of adjustment by rotation of the lever arm unit 10. In other words, because the spring 40 is starting in its most relaxed position, it will take a certain number of turns of the lever arm unit 10 to fully (or as fully as permitted by the drag adjustment assembly) compress the spring 40. The number of turns required to compress the spring 40 can be decreased (relative to the number of turns required when the first keyed washer 30 is as far away from the second keyed washer 50 as permitted by the nut 20) by adjusting the positioning of the first keyed washer 30 in the nut 20. Rotation of the nut 20 alone (without rotation of the lever arm unit 10) in a first direction causes the first keyed washer 30 to move linearly towards the second keyed washer 50, thereby limiting the distance that the first keyed washer 30 can move during rotation of the lever arm unit 10. With the first keyed washer 30 starting closer to the second keyed washer 50, the spring 40 is in a more compressed state at the start, and fewer turns of the lever arm unit 10 are required to fully compress the spring 40. In other words, rotation of the nut 20 changes the starting position of the first keyed washer 30 in the drag adjustment assembly 100.

Moreover, with fewer turns of the lever arm unit 10 required to fully compress the spring 40, it will be understood that the amount of drag provided by a single turn of the lever arm unit 10 is greater than the amount of drag provided by one turn of the lever arm unit 10 when the first keyed washer 30 starts in a position further away from the second keyed washer 50, i.e, when the spring 40 starts in a more relaxed state.

Figure 4:
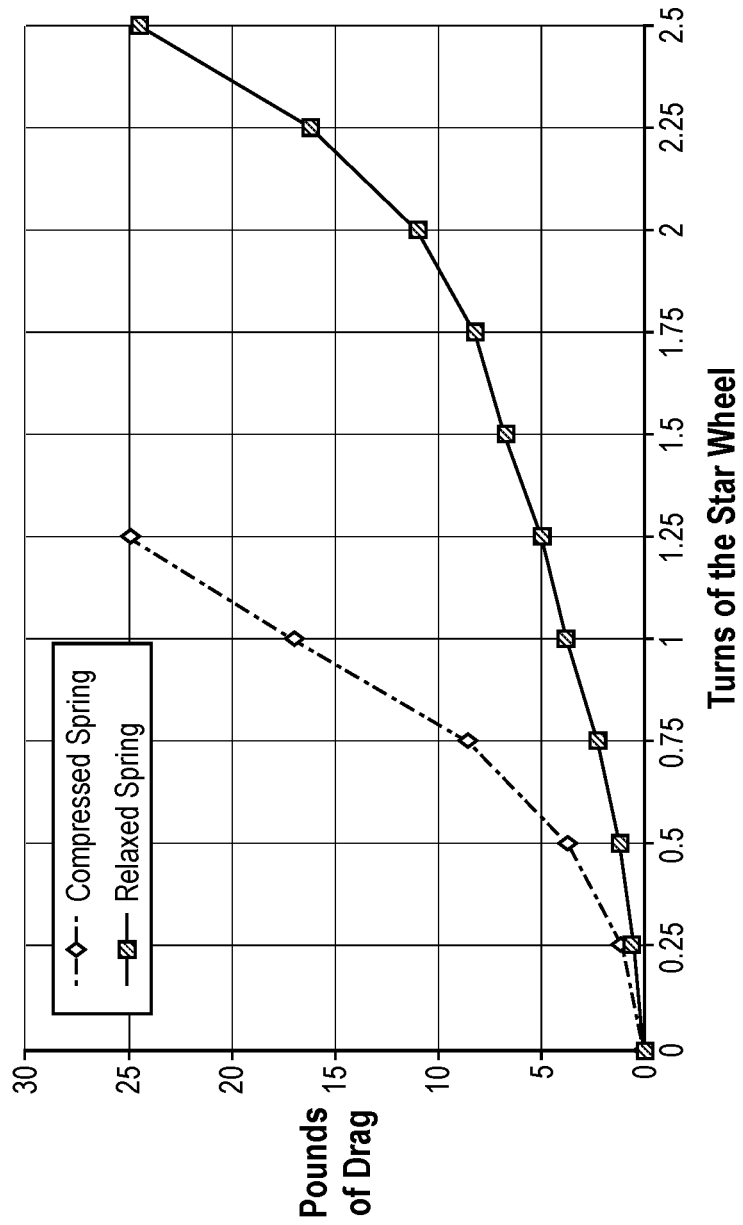
FIG. 4 is a graph showing the change in drag per turn of the star wheel at different initial spring compressions.

For example, FIG. 4 shows the amount of drag provided per turn of the lever arm unit 10 for a first scenario in which the first keyed washer 30 is as far away from the second keyed washer 50 as permitted by the nut 20 (i.e., the spring 40 is initially in its most relaxed state) and second scenario in which the first keyed washer 30 is as close to the second keyed washer 50 as permitted by the nut 20 (i.e., the spring 40 is initially in a somewhat compressed state). FIG. 4 shows that the change in drag per turn of the lever arm unit 10 is greater for the second scenario.

Any numerical ranges disclosed herein include all values from, and including, the lower value and the upper value. For ranges containing explicit values (e.g., 1 or 2, or 3 to 5, or 6, or 7) any subrange between any two explicit values is included (e.g., 1 to 2; 2 to 6; 5 to 7; 3 to 7; 5 to 6; etc.).

Among other things, it should be appreciated that the scope of the present disclosure is not limited to the number of constituting components, the materials thereof, the shapes thereof, the relative arrangement thereof, etc., as described above, but rather the above disclosures are simply provided as example embodiments. Further, any statements provided regarding features which may provide improved safety are not intended to guarantee, warrant or represent the safety of the platform support and integration assemblies, scaffold systems or platform systems disclosed herein.

Thus, it is specifically intended that the present invention not be limited to the embodiments and illustrations contained herein, but include modified forms of those embodiments including portions of the embodiments and combinations of elements of different embodiments as come within the scope of the following claims.

What is claimed is:

1. A drag adjustment assembly comprising:
   a lever arm unit forming a housing and comprising at least one keyway;
   a nut having a threaded inner surface positioned partially in the housing;
   a first keyed structure positioned in the housing, wherein the first keyed structure comprises at least one key engaging the at least one keyway and a threaded surface engaging the threaded inner surface of the nut;
   a second keyed structure positioned in the housing, wherein the second keyed structure comprises at least one key engaging the at least one keyway; and
   a spring secured between the first and second keyed structures.

2. The drag adjustment assembly of claim 1, wherein the spring comprises two or more Belleville washers.

3. The drag adjustment assembly of claim 2, wherein the two or more Belleville washers are in stacking in an alternating orientation.

4. The drag adjustment assembly of claim 3, wherein the spring comprises three Belleville washers.

5. The drag adjustment assembly of claim 1, wherein the first keyed structure is a first keyed washer comprising a base and a flange extending therefrom, wherein the base includes the at least one key and the flange include the threaded surface.

6. The drag adjustment assembly of claim 1, wherein lever arm unit, the nut, the first keyed structure, the second keyed structure and spring each include a central opening, wherein the central openings are coaxial.

7. The drag adjustment assembly of claim 1, wherein the lever arm unit comprises a base and the housing is in the form of a cylindrical flange extending from the base.

8. The drag adjustment assembly of claim 7, wherein the at least one keyway is a channel in the cylindrical flange.

9. The drag adjustment assembly of claim 8, wherein the base is circular and comprises a central circular opening, wherein the cylindrical flange is coaxial with the central circular opening, and wherein the lever arm unit comprises a plurality of grasping portions extending radially from the base.

10. The drag adjustment assembly of claim 9, wherein the central circular opening has an inner surface with a first portion having a first inner diameter and a second portion having a second inner diameter, wherein the first inner diameter is smaller than the second inner diameter.

11. The drag adjustment assembly of claim 10, wherein the nut comprises a cylindrical base having a first portion with a first outer diameter and a second portion with a second outer diameter and a driver head extending from the base, wherein the first outer diameter is less than the second outer diameter, wherein the first outer diameter is less than the first inner diameter of the first portion of the central circular opening of the cylindrical flange of the lever arm unit, and wherein the second outer diameter is greater than the first inner diameter of the first portion of the central circular opening of the cylindrical flange of the lever arm unit and less than the second inner diameter of the second portion of the central circular opening of the cylindrical flange of the lever arm unit.

12. The drag adjustment assembly of claim 11, wherein the nut is positioned in the cylindrical flange of the lever arm unit such that the cylindrical base is coaxial with the central circular opening of the lever arm unit and the driver head is outside of the housing.

13. A drag adjustment assembly comprising:
(A) a lever arm unit comprising
  (i) a circular base having a front surface, a rear surface, and an opening therethrough,
  (ii) a plurality of grasping portions extending radially from the circular base, and
  (iii) a cylindrical flange extending from the rear surface of the circular base coaxial with the opening and including a plurality of channels;
(B) a nut comprising
  (i) a cylindrical body having an outer surface, a front surface, a rear surface, and an opening therethrough, wherein the opening has a threaded inner surface, and
  (ii) a driver head extending from the front surface,
(C) a first keyed washer comprising
  (i) a cylindrical body having a front surface, a rear surface, and an opening therethrough,
  (ii) a plurality of tabs extending radially from the cylindrical body, and
  (iii) a cylindrical flange extending from the front surface coaxial with the opening, wherein the cylindrical flange has a threaded outer surface,
(D) a second keyed washer comprising
  (i) a cylindrical body having an opening therethrough, and
  (ii) a plurality of tabs extending radially from the cylindrical body,
(E) a spring comprising at least two Belleville washers each having an opening therethrough; and
(F) a sleeve;
wherein the nut is positioned in the cylindrical flange of the lever arm unit such that the opening of the nut is coaxial with the opening of the lever arm unit and the driver head projects beyond the front surface of the circular base of the lever arm unit;
wherein the first keyed washer is positioned in the cylindrical flange of the lever arm unit such that each of the plurality of tabs engages one of the plurality of channels of the lever thin unit, the threaded outer surface of the cylindrical flange of the first keyed washer engages the threaded inner surface of the cylindrical flange of the nut, and the opening of the first keyed washer is coaxial with the openings of the nut and the lever arm unit;
wherein the second keyed washer is positioned in the cylindrical flange of the lever arm unit such that each of the plurality of tabs engages one of the plurality of channels of the lever arm unit and the opening of the second keyed washer is coaxial with the openings of the first keyed washer, nut and the lever arm unit;
wherein the at least two Belleville washers are positioned in the cylindrical flange of the lever arm unit between the first and second keyed washers in an alternating orientation such that the openings of the at least two Belleville washers are coaxial with the openings of the second keyed washer, the first keyed washer, the nut and the lever arm unit; and
wherein the sleeve encircles the cylindrical flange of the lever akin unit.

14. The drag adjustment assembly of claim 13, wherein the spring comprises at least three Belleville washers.

15. The drag adjustment assembly of claim 13, wherein rotation of the lever arm unit causes rotation of the nut, first keyed washer and second keyed washer.

16. The drag adjustment assembly of claim 13, wherein rotation of the nut causes rotation of the first keyed washer only.

17. A star drag reel comprising
a lever arm unit forming a housing and comprising at least one keyway;
a nut having a threaded inner surface positioned partially in the housing;
a first keyed structure positioned in the housing, wherein the first keyed structure comprises at least one key engaging the at least one keyway and a threaded surface engaging threaded inner surface of the nut;
a second keyed structure positioned in the housing, wherein the second keyed structure comprises at least one key engaging the at least one keyway; and
a spring secured between the first and second keyed structures.

18. The star drag reel of claim 17, wherein the spring comprises at least three Belleville washers.

19. The star drag reel of claim 18, wherein
(A) the lever arm unit comprises
  (i) a circular base having a front surface, a rear surface, and an opening therethrough,
  (ii) a plurality of grasping portions extending radially from the circular base, and
  (iii) a cylindrical flange forming the housing, the flange extending from the rear surface of the circular base coaxial with the opening, wherein the at least one keyway comprises a plurality of channels in the cylindrical flange;
(B) the nut comprises
  (i) a cylindrical body having an outer surface, a front surface, a rear surface, and an opening therethrough, wherein the opening has the threaded inner surface, and
  (ii) a driver head extending from the front surface,
(C) the first keyed structure comprises
  (i) a cylindrical body having a front surface, a rear surface, and an opening therethrough, and
  (ii) a cylindrical flange having an outer surface and extending from the front surface coaxial with the opening,
  wherein the at least one key is a plurality of tabs extending radially from the cylindrical body, and
  wherein the threaded surface is on the outer surface of the cylindrical flange;
(D) the second keyed structure comprises
  (i) a cylindrical body having an opening therethrough, wherein the at least one key is a plurality of tabs extending radially from the cylindrical body, and
(E) the Belleville washers each have an opening therethrough.

20. The star drag reel of claim 19, further comprising a main drive shaft,
wherein the nut is positioned in the cylindrical flange of the lever arm unit such that the opening of the nut is coaxial with the opening of the lever arm unit and the driver head projects beyond the front surface of the circular base of the lever arm unit;
wherein the first keyed washer is positioned in the cylindrical flange of the lever arm unit such that each of the plurality of tabs engages one of the plurality of channels of the lever arm unit, the threaded outer surface of the cylindrical flange of the first keyed washer engages the threaded inner surface of the cylindrical flange of the nut, and the opening of the first keyed washer is coaxial with the openings of the nut and the lever arm unit;

wherein the second keyed washer is positioned in the cylindrical flange of the lever arm unit such that each of the plurality of tabs engages one of the plurality of channels of the lever arm unit and the opening of the second keyed washer is coaxial with the openings of the first keyed washer, nut and the lever arm unit;

wherein at least two of the at least three Belleville washers are positioned in the cylindrical flange of the lever arm unit between the first and second keyed washers in an alternating orientation such that the openings of the at least two of the at least three Belleville washers are coaxial with the openings of the second keyed washer, the first keyed washer, the nut and the lever arm unit; and wherein the main drive shaft extends through the coaxial openings of the nut, first keyed washer, Belleville washers, and second keyed washer.

* * * * *